US010498886B2

(12) United States Patent
Patel et al.

(10) Patent No.: US 10,498,886 B2
(45) Date of Patent: *Dec. 3, 2019

(54) DYNAMICALLY SWITCHING COMMUNICATIONS TO TEXT INTERACTIONS

(71) Applicant: INTERACTIVE INTELLIGENCE GROUP, INC., Indianapolis, IN (US)

(72) Inventors: Kalpit Patel, Cary, NC (US); Richard J. Walsh, Raleigh, NC (US); Michael David Snyder, Noblesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,142

(22) Filed: May 11, 2018

(65) Prior Publication Data

US 2018/0262616 A1   Sep. 13, 2018

Related U.S. Application Data

(63) Continuation of application No. 14/714,939, filed on May 18, 2015.

(51) Int. Cl.
| | |
|---|---|
| *H04M 3/00* | (2006.01) |
| *H04M 5/00* | (2006.01) |
| *H04M 3/42* | (2006.01) |
| *H04L 12/58* | (2006.01) |
| *H04M 3/523* | (2006.01) |
| *H04M 7/00* | (2006.01) |
| *G10L 15/26* | (2006.01) |
| *G10L 15/32* | (2013.01) |

(52) U.S. Cl.
CPC ........ *H04M 3/42382* (2013.01); *H04L 51/04* (2013.01); *H04L 51/066* (2013.01); *H04M 3/523* (2013.01); *H04M 7/0045* (2013.01); *G10L 15/26* (2013.01); *G10L 15/32* (2013.01); *H04M 2201/40* (2013.01); *H04M 2201/60* (2013.01)

(58) Field of Classification Search
CPC ... H04M 3/42382; H04L 51/04; H04L 51/066
USPC ....... 379/265.01–265.14, 266.01–266.1, 309
See application file for complete search history.

(56) References Cited

U.S. PATENT DOCUMENTS

| | | |
|---|---|---|
| 6,298,130 B1 | 10/2001 | Galvin |
| 6,366,882 B1 | 4/2002 | Bijl et al. |
| 6,754,335 B1 | 6/2004 | Shaffer et al. |
| 7,869,998 B1 | 1/2011 | Di Fabbrizio et al. |
| 8,467,519 B2 | 6/2013 | Odinak et al. |
| 8,774,392 B2 | 7/2014 | Odinak et al. |
| 9,191,512 B1 | 11/2015 | Lillard |
| 9,386,154 B2 | 7/2016 | Baciu et al. |
| 9,843,667 B2* | 12/2017 | Kim .................. H04M 1/72597 |
| 10,033,870 B1* | 7/2018 | Koster ............... H04M 3/5141 |
| 2001/0047260 A1 | 11/2001 | Walker et al. |
| 2003/0177009 A1 | 9/2003 | Odinak et al. |
| 2003/0233246 A1 | 12/2003 | Snapp et al. |
| 2004/0190689 A1 | 9/2004 | Benitez Pelaez et al. |

(Continued)

*Primary Examiner* — William J Deane, Jr.

(57) ABSTRACT

Methods for dynamically switching communications to text interactions are provided. In one example, a method includes the steps of receiving a phone call and determining a voice queue wait time exceeds a predetermined threshold. The phone call is routed to a speech-to-text queue based on the determination, and an audio signal associated with the phone call is converted to an instant message interaction.

8 Claims, 4 Drawing Sheets

300

(56) References Cited

U.S. PATENT DOCUMENTS

| | | |
|---|---|---|
| 2006/0083364 A1 | 4/2006 | Bossemeyer, Jr. et al. |
| 2006/0089971 A1 | 4/2006 | Wilensky |
| 2006/0242246 A1 | 10/2006 | Lyle et al. |
| 2007/0071223 A1* | 3/2007 | Lee .................. H04M 3/48 379/265.02 |
| 2008/0147395 A1* | 6/2008 | Da Palma ............ H04L 51/04 704/235 |
| 2009/0110167 A1 | 4/2009 | Parker, II et al. |
| 2009/0136012 A1 | 5/2009 | Boyd et al. |
| 2010/0077082 A1 | 3/2010 | Hession et al. |
| 2010/0296484 A1 | 11/2010 | Wu |
| 2011/0051918 A1 | 3/2011 | Fan et al. |
| 2015/0286993 A1 | 10/2015 | Monk |
| 2015/0312416 A1 | 10/2015 | Cahill et al. |
| 2015/0350438 A1 | 12/2015 | Arslan et al. |
| 2016/0093290 A1 | 3/2016 | Lainez et al. |
| 2016/0275938 A1 | 9/2016 | Gopalakrishnan et al. |
| 2016/0344869 A1 | 11/2016 | Patel et al. |

* cited by examiner

DYNAMICALLY SWITCHING COMMUNICATIONS TO TEXT INTERACTIONS

CROSS-REFERENCE TO RELATED APPLICATIONS

This application is a continuation of U.S. patent application Ser. No. 14/714,939, filed on May 18, 2015, the content of which is incorporated herein by reference.

FIELD

This invention relates generally to contact centers, and more specifically to dynamically switching communications to text interactions.

BACKGROUND

In a conventional contact center, every call may be handled in a uniform manner according to a static rule, such as first-in first-out. That is, when a call is received that call may automatically be routed to the shortest queue. On its face, such rigid routing rules may seem like a fair way to treat all callers.

By treating every caller according to a set of rigid rules, however, some callers may be forced to wait longer than necessary to begin an interaction and have their issue resolved. Thus there is a need for new methods to manage communications in a contact center.

SUMMARY

Embodiments of the invention dynamically switch communications to text interactions. An exemplary method may comprise the steps of receiving a phone call and determining a voice queue wait time exceeds a predetermined threshold. The method comprises the additional steps of routing the phone call to a speech-to-text queue and converting an audio signal associated with the phone call to an instant message interaction.

In another aspect, a method comprises the steps of receiving an incoming communication, determining a wait time associated with a first queue exceeds a predetermined threshold, routing the incoming communication to a second queue, and converting an audio signal associated with the incoming communication to an instant message conversation.

In another aspect, a method comprises the steps of receiving an incoming communication and determining an interaction type based on an interaction factor. The method includes the additional steps of assigning the interaction type to the incoming communication based at least in part on the interaction factor and routing the incoming communication to a queue based at least in part on the interaction type.

Further embodiments, features, and advantages of the invention, as well as the structure and operation of the various embodiments of the invention are described in detail below with reference to the accompanying drawings.

BRIEF DESCRIPTION OF THE DRAWINGS

The accompanying drawings, which are incorporated herein and form a part of the specification, illustrate the present invention and, together with the description, serve to explain the principles of the invention and to enable a person skilled in the pertinent art to make and use the invention.

DETAILED DESCRIPTION

Figure 1:
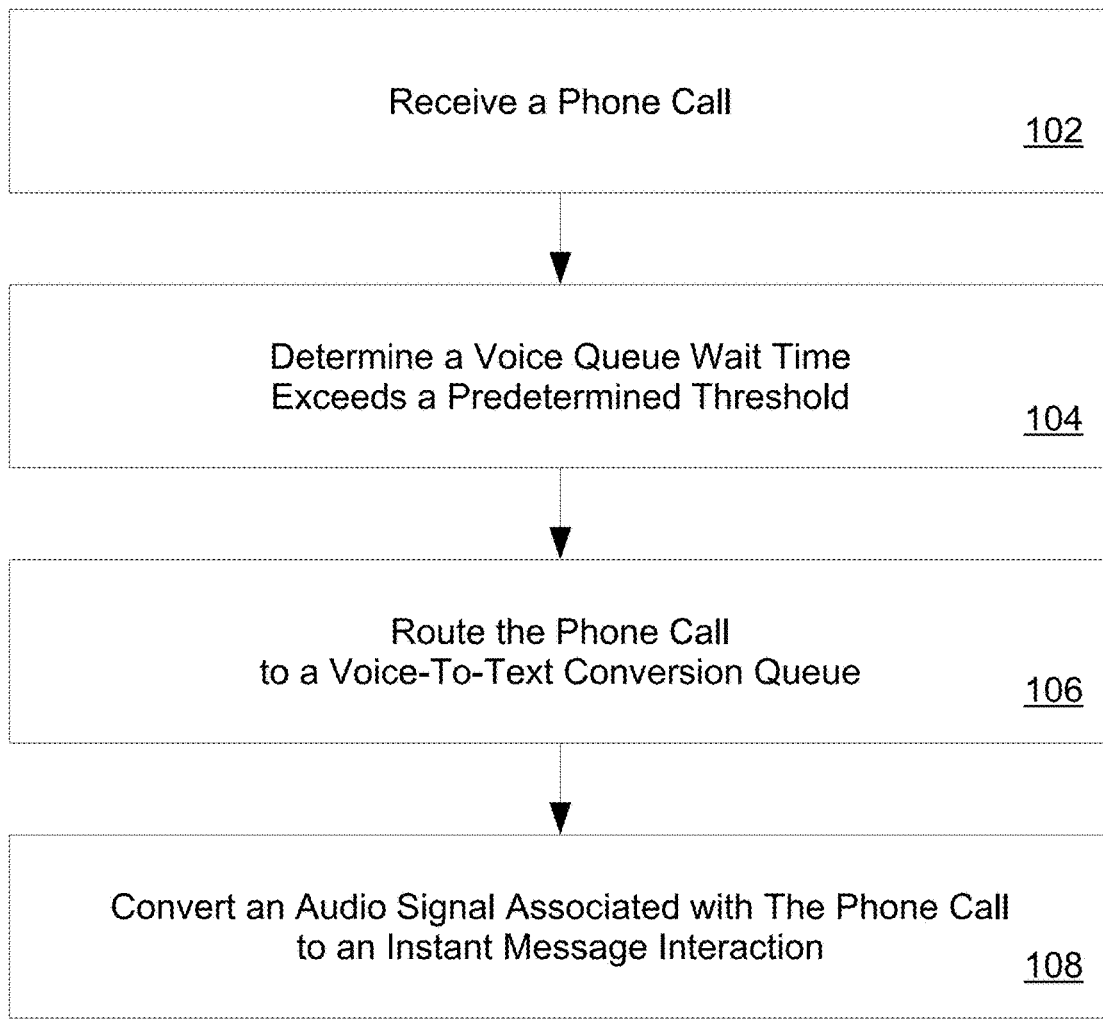
FIG. 1 is a flow chart illustrating a method according to an embodiment.

Embodiments are described for dynamically switching communications to text interactions. When agents are unavailable to interact with a high resource cost call, such as a voice or video call, the call may be dynamically switched, or converted, to a low resource cost call, such as an instant message conversation using speech-to-text analysis. By dynamically switching communications to text interactions, organizations can make better use of their limited contact center resources, while simultaneously reducing the time customers wait for an interaction with an agent.

In one exemplary embodiment an organization may operate a contact center system for managing phone calls and interacting with callers. The contact center system may automatically answer phone calls and route the phone calls to different call queues as the calls are received. One or more contact center agents may be assigned to a call queue for answering calls and interacting with callers as the agent becomes available. An agent may be able to handle only one voice call at a time, while being capable of handling multiple text or instant message interactions simultaneously.

In the example, a customer calls the organization. The phone call is received by the contact center system, and the contact center system determines whether a voice queue wait time exceeds a predetermined threshold. Specifically, in the illustration, the predetermined threshold for the voice queue wait time is five minutes. The contact center system determines whether an agent can interact with the caller over the voice channel within five minutes. If an agent is available to interact with the phone call over the voice channel within the predetermined threshold of five minutes, than the phone call may be routed to a voice queue.

In this example, the voice queue wait time exceeds the five minute predetermined threshold, and the contact center system routes the phone call to a speech-to-text queue. Calls in the speech-to-text queue may be converted to instant message conversations with an agent by converting an audio signal associated with the phone call to an instant message interaction. As an agent interacts with the phone caller via instant message, the text messages typed by the agent may be converted back to speech. For some callers, the speech-to-text and text-to-speech conversation may be seamless and go undetected. By dynamically switching communications to text interactions, the bandwidth of the contact center system may be increased, with contact center agents interacting with more callers over a set period of time.

Illustrated Methods

Selected methods are illustrated and described for dynamically switching communications to text interactions. In conventional contact center systems, all calls may be routed according to the same rules, despite the differences in interaction mediums. Dynamically switching communications to text interactions, however, takes advantage of the capabilities of some agents to handle multiple interactions of different types. By dynamically switching communications to text interactions, contact center resources may be maximized and directed towards the highest priority targets.

FIG. 1 is a flow chart illustrating a method according to an embodiment. As shown in FIG. 1, in step 102 of method 100, a phone call may be received. A phone call, or voice call, may comprise an audio signal. A phone call may comprise other information, such as caller ID information or geographic information.

Figure 3:
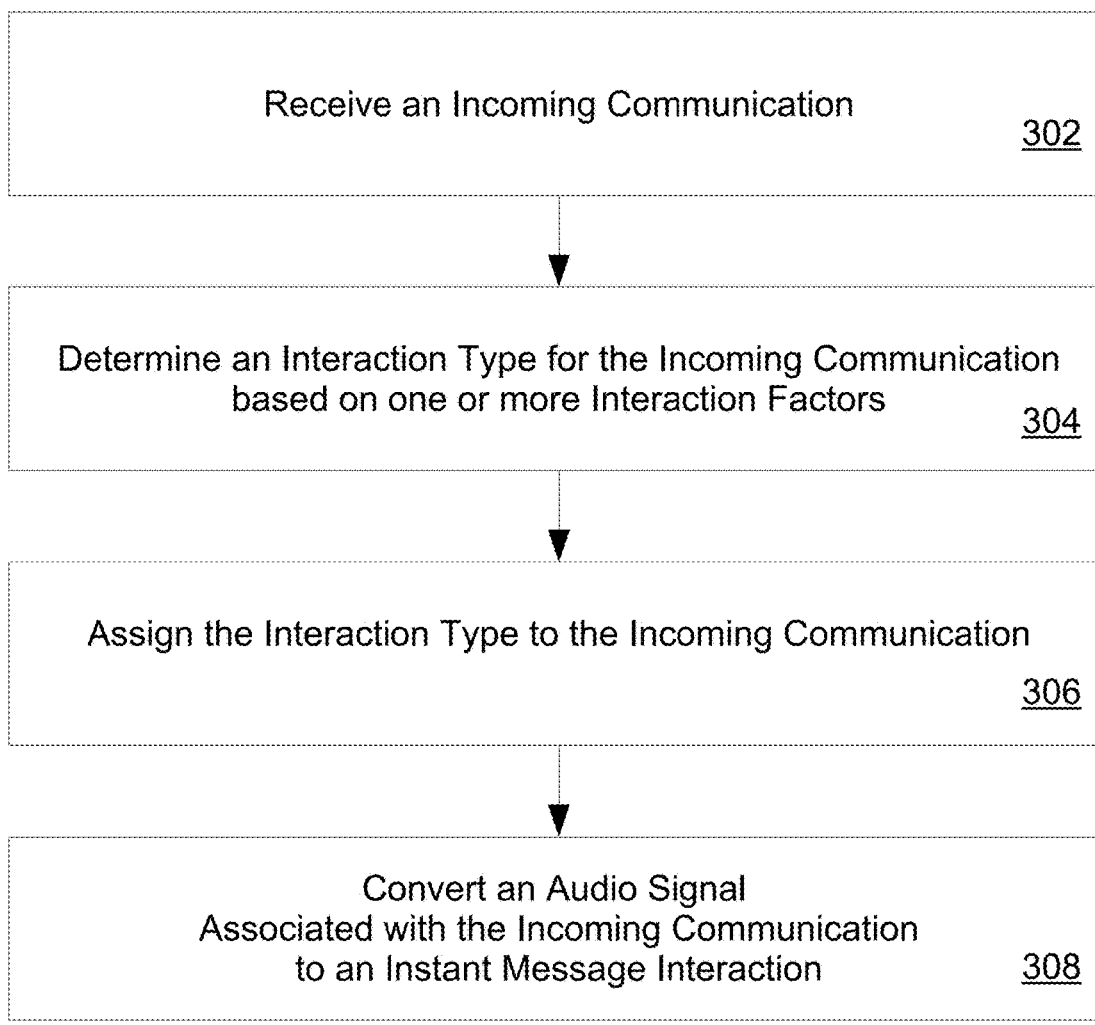
FIG. 3 is a flow chart illustrating a method according to another embodiment.

A server, such as server 308 as illustrated in FIG. 3 and discussed below, may receive the phone call. The phone call may be received over a traditional telephone line (e.g. plain old telephone service, or POTS), or it may be received over an internet protocol telephony service such as VOIP. The server may operate a contact center system. In other embodiments, other types of communications may be received, such as a video call, or instant message conversation.

A caller, such as a business customer, may generate a phone call. The term "caller" may refer to the person that causes a device, such as a smartphone, limited capability phone (e.g. "feature phone"), tablet, personal computer, or other device to call or transmit a communication over a network. In the embodiment illustrated in FIG. 1, a caller may cause a phone call to be generated. In other embodiments, a caller may cause some other type of communication to be generated, such as a video call or instant message chat. As such, a caller may comprise, for example and without limitation, a voice caller, a video caller, or an instant message chatter.

A contact center system may comprise one or more contact center stations. A contact center agent may access the center system through a graphical user interface generated by the contact center station. The contact center system may manage incoming communications, such as phone calls, route incoming communications to contact center stations or automatic call distribution queues, and facilitate interactions between a contact center agent and a caller.

A contact center system may comprise one or more queues for keeping a communication alive until an agent becomes available to interact with the caller associated with the communication.

A goal of dynamically switching communications to text interactions may be to reduce overall waiting time for an interaction to begin, irrespective of the original medium of the incoming communication. Some contact center systems may comprise a voice queue, where voice calls are routed before a voice interaction can begin. According to some embodiments, a system administrator may specify a predetermined threshold of a voice queue wait time. The predetermined threshold of a voice queue may comprise an upper limit for the amount of time a voice interaction should begin.

After a phone call is received, a voice queue wait time may be determined to exceed a predetermined threshold, as illustrated in step 104. The voice queue wait time may comprise an estimated amount of time before a voice interaction may be started by a contact center agent. As discussed below, other interaction factors may be used for dynamically switching communications to text interactions. For example, in one embodiment, a caller may be given the option to bypass a long voice interaction queue and choose a speech-to-text interaction queue with a shorter wait time. In this manner a caller can choose to have their interaction begin sooner over a different interaction medium than their original interaction medium.

In step 106, the phone call may be routed to a voice-to-text conversion queue. The phone call may be routed to the voice-to-text conversion queue rather than the voice queue based on the voice queue wait time. In one alternative embodiment, an incoming communication may be assigned an interaction type, and then routed to a queue comprising communications of a plurality of interaction types.

In step 108, an audio signal associated with the phone call may be converted to an instant message interaction. An audio signal may be converted to an instant message interaction through speech recognition (sometimes called speech-to-text, STT, or voice-to-text). Speech recognition may be speaker independent (i.e. speech recognition that does not use individual training) or speaker dependent (i.e. speech recognition that does use individual training). As speech recognition techniques become more advanced, speaker independent speech recognition may advantageously bypass tedious speaker training.

On the other hand, methods according to some embodiments may utilize limited hidden or invisible speaker training without requiring heavy-handed training. Such limited speaker training may be utilized by analyzing caller responses to a voice response unit of a contact center system.

In one scenario, a caller may generate a voice call to a contact center system. The contact center system may receive the voice call and determine that the wait time to answer the call over a voice channel of communication (or the voice queue wait time) exceeds a predetermined threshold of two minutes. In other words, the contact center system may determine that it is unlikely an agent will be able to respond to the incoming voice call within two minutes. In the scenario, the voice call may then be routed to a speech-to-text queue. The speech-to-text queue may have a shorter wait time, and in some cases may have no wait time at all.

In the scenario, when a contact center agent begins interacting with the caller, text typed by the agent may be automatically converted to speech. As the conversation continues, an audio signal associated with the voice call, such as words spoken by the caller or the agent, may be converted to text. In such a way the contact center agent may communicate with a voice caller over an instant message or text channel, while the voice caller communicates with the contact center agent over an audio channel.

Some contact center agents may respond to voice calls more easily over text than voice. In one scenario, a caller's audio signal or voice channel may be provided to the contact center agent in lieu of a converted speech-to-text channel. The contact center agent may listen to the caller, but respond over text. Or, a caller's audio signal may be provided to the contact center agent alongside a text transcript of the audio signal, making it easy for the agent to initially hear the caller's issues, but refer back to the transcript at a later point in the conversation to clarify an issue.

Figure 2:
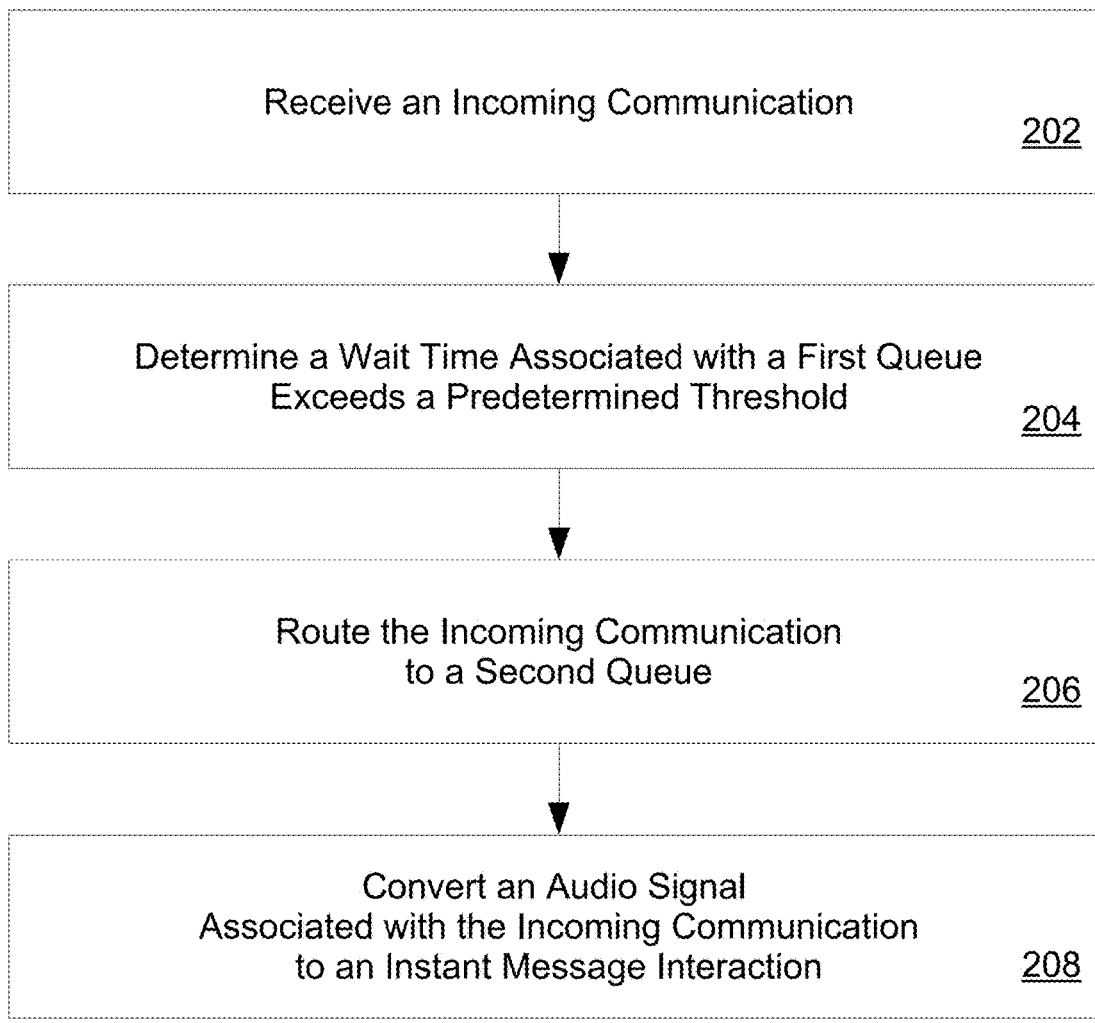
FIG. 2 is a flow chart illustrating a method according to another embodiment.

FIG. 2 is a flow chart illustrating a method according to another embodiment. As illustrated in FIG. 2, in step 202 of method 200, an incoming communication may be received. An incoming communication, or a call, may comprise a phone call (sometimes called a voice call), a video call (sometimes called a video chat), or an instant message chat (sometimes called a text chat). In other embodiments, an incoming communication may comprise a different type of call. An incoming communication may comprise one or more media signals. A media signal may comprise an audio signal (sometimes called a voice signal), a video signal, or a text signal. A voice call may comprise a media signal comprising a voice signal. A video call may comprise a first media signal comprising a voice signal and a second media signal comprising a video signal.

Figure 4:
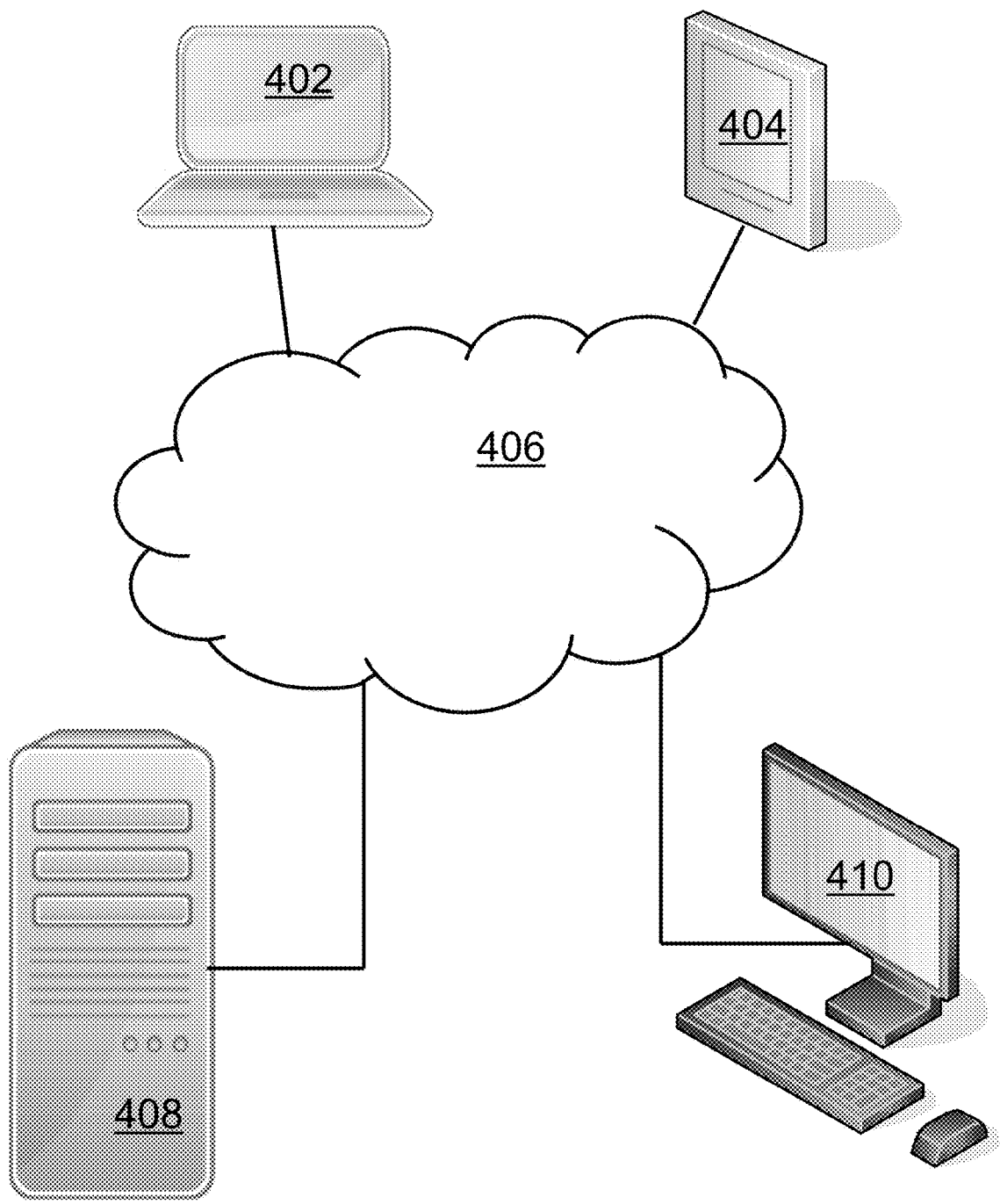
FIG. 4 is a diagram illustrating a system according to an embodiment.

A caller intending to interact with a contact center agent may generate an incoming communication. An incoming communication may be received by server 408, as illustrated in FIG. 4 and discussed below. In one embodiment, an incoming communication may comprise an active or open and ongoing communication channel, such as a voice call, video chat, or instant message chat. In another embodiment, an incoming communication may comprise a passive communication channel, such as an email message or SMS text message.

In step 204, a wait time associated with a first queue may be determined to exceed a predetermined threshold. In one embodiment, the first queue may comprise a video call queue or a voice call queue. Because video calls and voice calls may naturally require more attention from a contact center agent, video calls and/or voice calls may naturally have longer queues than an instant message queue in contact centers with limited resources.

In step 206, the incoming communication may be routed to a second queue. The second queue may comprise a faster moving queue than the first queue. In one embodiment, the first queue comprises a voice call queue, and the second call queue comprises an instant message queue. As discussed above, an instant message queue may move faster than a voice call queue as contact center agents may be able to interact more quickly over an instant message conversation than a voice conversation.

In step 208, an audio signal associated with the incoming communication may be converted to an instant message interaction. The audio signal may be converted using speech-to-text technology. An agent may interact with the caller over the instant message interaction, and the instant message texts generated by the agent may be converted to speech by text-to-speech technology. Depending on the quality of the call connection and the text-to-speech technology, the dynamic conversation of an interaction from voice to text may be seamless or invisible to a caller.

FIG. 3 is a flow chart illustrating a method according to another embodiment. As illustrated in FIG. 3, in step 302 of method 300, an incoming communication may be received. An incoming communication may comprise a phone call, a video chat, or an instant message chat (sometimes called a text chat). The incoming communication may be received by a contact center system.

In step 304, an interaction type may be determined for the incoming communication. An interaction type may comprise a communications channel such as video, voice, or text. In some conventional contact centers, an interaction type is never changed for a communication. For example, all voice calls may remain voice interactions. Embodiments of the invention, however, may dynamically switch interaction types. By dynamically switching communications to text interactions, contact center resources may be maximized and directed towards the highest priority targets.

An interaction type may be determined based on one or more interaction factors. Examples of interaction factors include, without limitation, a call quality of service, a language associated with the incoming communication, a caller preference, or a resource intensity. Other interaction factors comprise current historical, and/or predicted information related to call volume, bandwidth metrics, agent availability, and queue call time.

An interaction factor comprises a call quality of service. A contact center system may rate the quality of service associated with an incoming communication. The quality of service associated with an incoming communication may reflect how easy it is to hear the audio signal from a call, or how well a video signal is received. Calls generated over poor connections, for example, bad cellular connections or low bandwidth connections, may be rated as low quality of service. In one scenario, it may be advantageous to assign a text interaction type to a call with a low quality of service.

An interaction factor may comprise a language and/or a dialect associated with the incoming communication. A contact center system may be able to determine or guess a native language spoken by a caller associated with an incoming communication. For example, a number or geographic location associated with an incoming communication may be associated with a specific language. For example, an international call from Brazil may be associated with Portuguese, while an international call from Mexico may be associated with Spanish. Alternatively, or in addition to automatic analysis of caller identification information, the interactive voice response (IVR) system may prompt the user for their preferred language: "Hablas Española? Pulse uno."

If no agents are available to interact with the caller in the caller's native language, than the contact center system may determine a text interaction type for the call. Speech recognition software may then translate an audio signal associated with the incoming communication to an instant message conversation with an agent in the agent's preferred language. Text entered by the agent during the conversation may then be translated back to the native language of the caller, and converted to an audio signal using text-to-speech software.

An interaction factor may comprise a caller preference. A contact center system may receive a user preference for a type of interaction, such as a preference for a voice interaction, video interaction, or text interaction. A caller preference may indicate whether a user prefers to have their call handled as quickly as possible over any type of communication, or if the user prefers to have their call handled according to the manner it was placed, without switching.

An interaction factor may comprise the caller identity. Identification information may be received with an incoming communication. Information received with an incoming communication may be used to identify a caller. A caller may be the person generating the incoming communication, such as a voice caller (phone caller), video caller, or instant message writer. Identification information may comprise caller ID, an IP address, or G.P.S. coordinates. In one embodiment, a phone call and caller ID is received. Caller ID may identify a phone number associated with a device, such as a phone, generating the incoming communication. An IP address may identify the Internet Protocol address of a device generating an incoming communication. G.P.S. coordinates may identify the location of a device generating an incoming communication.

In some embodiments, an interaction type may be assigned to a call based at least in part on the caller identification information. For example, some callers may be classified as high value callers. Interactions associated with such high value callers may be automatically assigned a voice or video interaction type.

An interaction factor may comprise a resource intensity or interaction cost. Contact center agents may interact with callers over one or more interaction mediums, such as voice, video, or text. Different interaction mediums may be classified or rated according to a resource intensity or a cost for handling the particular interaction medium. In one embodiment a contact center agent may be able to only handle one video call at a time. Accordingly a video call, or video chat, may be classified as a high resource interaction. A contact center agent may be able to simultaneously interact with one caller of a video call while interacting with one or more other callers over instant message. Accordingly a phone call, or voice call, may be classified as a medium resource interaction. A contact center agent may be able to carry on multiple instant message chats simultaneously. Accordingly, an instant message chat (sometimes called an instant message call or text chat) may be classified as a low resource interaction.

In the embodiment, the high resource classification may be based on the capabilities of a contact center agent to only handle one video call interaction at a time. During a period of high volume video calls, call queues may lengthen as the bandwidth for the contact center system falls. When a predetermined threshold of high resource intensive calls are received, new incoming communications may be assigned to lower resource interactions for managing the contact center bandwidth.

In step 306, the interaction type is assigned to the incoming communication. The interaction type may be assigned to the incoming communication based at least in part on the one or more interaction factors. In one embodiment, a contact center system may generate metadata associated with an incoming communication. Metadata associated with an incoming communication may comprise an identity of a caller, a time that the call was received, and the original interaction type of a communication. Metadata associated with an incoming communication may be used by a contact center system for routing the call to a queue or contact center agent. In the embodiment, an interaction type may be assigned to an incoming communication by updating the metadata associated with the incoming communication.

The contact center system may dynamically determine or change an interaction type during the course of a communication. The contact center system may evaluate on an ongoing basis the latest system information, such as bandwidth and agent availability. In one alternative, a contact center metric may trigger a re-evaluation and potential change in interaction type. As one example, as a contact center reaches capacity for a specific type of interaction, such as video interactions, than new or existing communications may be assigned to a lower resource interaction type.

The assignment or reassignment of an interaction type may be influenced by additional information obtained during the call. For example, a communication for an agent working with a customer on a high priority issue, such as creating a new account or depositing a large sum of money, may be dynamically promoted to a voice interaction from a text interaction based on a trigger that evaluated the importance of the call (e.g. customer wants to deposit a large sum of money).

In step 308, the incoming communication may be routed to a queue based at least in part on the interaction type. In one embodiment a contact center system may assign incoming communications to a queue based at least in part on metadata associated with an incoming communication. A queue assignment function may utilize the interaction type or the queue assignment may re-evaluate the interaction type before a call is assigned to an agent.

Illustrated System

FIG. 4 is a diagram illustrating a system according to an embodiment. System 400 comprises caller devices 402, 404, network 406, server 408, and contact center station 410. Caller devices 402, 404, server 408, contact center station 410 may be in communication over network 406. Network 406 may comprise the Internet, an intranet, or extranet, or some other type of electronic network.

In one embodiment, a contact center system may be operated by a business. A caller may comprise an existing business customer, a prospective customer, partner, or some other party intending to communication with the business. A caller may utilize a caller device, such as caller devices 402, 404, to generate a call, or communication, with the contact center system. Examples of caller devices comprise, for example and without limitation, a personal computer, tablet, smartphone, or a feature phone. As shown in FIG. 4, caller device 402 comprises a personal computer 402, and caller device 404 comprises a smartphone.

A caller device may be configured to transmit identification information before or during a communication. Identification information may comprise caller ID, an IP address, or location information. Identification information may be associated with the caller device, such as the location of the caller device or the IP address of the caller device. In one alternative, identification information may be associated with a user associated with the caller device, such as a name or email address of a user.

As shown in FIG. 4, a caller may use a caller device, such as caller devices 402, 404 to generate a phone call, video call, instant message chat, or some other form of communication. In one embodiment, a customer uses smartphone 404 to communicate with a contact center system executing on server 408. Server 408 may be in communication with one or more caller devices such as caller devices 402, 404, as well as one or more contact center stations, such as contact center station 410. Server 408 may execute contact center software for facilitating interactions between callers and agents. An agent may access a contact center system executing on server 408 through client software executing on a contact center station 410. Contact center software executing on server 408 may facilitate interactions over a network such as Network 406, between callers using caller devices and agents using contact center stations.

A contact center station may comprise a network enabled device configured to execute contact center software and communicate with server 408 over network 406. A contact center agent may access a contact center system through contact center station 410. Examples of contact center stations comprise a personal computer, such as personal computer 410, or a mobile device. A contact center station in the form of a mobile device may comprise a smartphone, e-reader, phablet, or a tablet. In other embodiments, a contact center station may comprise other types of devices. Contact center station 410 may be configured to generate a graphical user interface, and execute an application within the graphical user interface. Applications operating on caller devices may comprise native mobile device applications such as an iOS iPad application, a Windows Phone application, or an Android application. As one alternative, an application operating on a caller device may comprise a web application accessed through a web browser.

Server 408 may receive incoming communications from caller devices 402, 404. In one embodiment, an incoming communication may comprise an active or open and ongoing communication channel, such as a voice call, video chat, or instant message chat. In another embodiment, an incoming communication may comprise a passive communication channel, such as an email message or SMS text message. Server 408 may also receive identification information from caller devices 402, 404. For example, Server 408 may receive caller ID, a caller's IP address, and/or a caller's G.P.S. location.

Server 408 may be in communication with one or more data stores (not illustrated in FIG. 4). A data store may store information about contact center agents and/or callers. A data store may comprise an internal data store or an external data store. In some embodiments, a data store comprises an internal data store. An internal data store may be operated by the same organization operating server 408. In one embodiment, an internal data store comprises a CRM database. In other embodiments, an internal data store comprises some other type of data store.

In some embodiments, a data store comprises an external data store. An external data store may not be operated by the same organization operating server 408. Sever 408 may interact with an external data store as a third party. An external data store may comprise a social media feed, such as a Facebook feed, Twitter feed, Vine feed, or Instagram feed.

Information gathered from one or more data stores may be used for assigning an interaction type to a call. In one example, a contact center system may use caller identification information to determine an identity of a caller associated with a call and assign an interaction type to the call based on the identity. In the example, a caller makes a voice call to the contact center system using a smartphone. The incoming communication may comprise caller identification data such as caller ID. Server 408 may analyze the caller identification information and compare the caller identification information with records in one or more data stores to determine an identity of a caller associated with the call. A contact center system may generate a request for an interaction preference. The contact center system may recognize a caller, and use a provided interaction preference to assigning an interaction type.

SCOPE

Embodiments of a subset or all and portions or all of the above may be implemented by program instructions stored in a memory medium or carrier medium and executed by a processor. A memory medium may be a transitory medium or non-transitory medium. A memory medium may include any of various types of memory devices or storage devices. The term "memory medium" is intended to include an installation medium such as a Compact Disc Read Only Memory (CD-ROM) floppy disks, tape device, a computer system memory or random access memory such as Dynamic Random Access Memory DRAM Double Data Rate Random Access Memory DDR RAM Static Random Access Memory SRAM Extended Data Out Random Access Memory EDO RAM Rambus Random Access Memory RAM etc. or a non-volatile memory such as a magnetic media e.g. a hard drive or optical storage. The memory medium may comprise other types of memory as well or combinations thereof. In addition the memory medium may be located in a first computer in which the programs are executed or may be located in a second different computer that connects to the first computer over a network such as the Internet. In some instances the second computer may provide program instructions to the first computer for execution. The term memory medium may include two or more memory mediums that may reside in different locations e.g. in different computers that are connected over a network.

In some embodiments a computer system at a respective participant location may include a memory medium on which one or more computer programs or software components according to one embodiment of the present invention may be stored For example the memory medium may store one or more programs that are executable to perform the methods described herein The memory medium may also store operating system software as well as other software for operation of the computer system.

Modifications and alternative embodiments of one or more aspects of the invention may be apparent to those skilled in the art in view of this description. Accordingly this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art rely after having the benefit of this description of the invention. Changes may be made in the elements described herein without departing from the spirit and scope of the invention as described above and below.

What is claimed is:

1. A method for dynamically switching communications to text interactions, the method comprising:
   receiving, by a processor, a phone call;
   determining, by the processor, a resource cost associated with the phone call exceeds a predetermined threshold, wherein the resource cost associated with the phone call is calculated based on at least a voice queue wait time;
   routing, by the processor, the phone call to a speech-to-text queue;
   converting, by the processor, an audio signal associated with the phone call to an instant message interaction;
   updating, by the processor, the resource cost;
   determining, by the processor, the resource cost exceeds the predetermined threshold; and
   converting, by the processor, the instant message interaction to a voice interaction.

2. A method for dynamically switching communications to text interactions, the method comprising:
   receiving, by a processor, an incoming communication;
   determining, by the processor, a resource cost associated with the incoming communication exceeds a predetermined threshold, wherein the resource cost is calculated based on at least a first queue wait time;
   routing, by the processor, the incoming communication to a second queue;
   determining, by the processor, the resource cost associated with the incoming communication exceeds the predetermined threshold, wherein the resource cost is calculated based on at least a second queue wait time;
   converting, by the processor, an audio signal associated with the incoming communication to an instant message conversation;
   updating, by the processor, the resource cost;
   determining, by the processor, the resource cost exceeds a predetermined threshold; and
   converting, by the processor, the instant message conversation to a voice conversation.

3. The method of claim 2, wherein the wait time comprises a first wait time and further comprising:
   determining a second wait time associated with the second queue;
   generating a routing message comprising the wait time and the second wait time; and
   receiving an interaction preference associated with the incoming communication,
   wherein the routing the incoming communication to the second queue is based at least in part on the interaction preference.

4. A method for dynamically switching communications to text interactions, the method comprising:
   receiving, by a processor, an incoming communication;

determining, by the processor, an interaction type based on a plurality of interaction factors, wherein the plurality of interaction factors include at least resource cost;

assigning the interaction type to the incoming communication based at least in part on the interaction factors; and routing the incoming communication to a queue based at least in part on the interaction type.

5. The method of claim 4, wherein the interaction factor comprises a quality of service associated with the incoming communication and further comprising:

generating a quality of service rating associated with the incoming communication;

determining the quality of service rating does not exceed a predetermined threshold; and wherein routing the incoming communication to a speech-to-text queue is further based on quality of service rating.

6. The method of claim 4, wherein the interaction factor comprises a language associated with the incoming communication and the method further comprises the steps of:

determining the language associated with the incoming communication, and wherein routing the incoming communication to a speech-to-text queue is further based on the language associated with the incoming communication.

7. The method of claim 4, wherein the interaction factor comprises a user preference and the method further comprises the steps of:

determining an interaction preference associated with the incoming communication.

8. The method of claim 4, wherein assigning the interaction type to the incoming communication comprises updating metadata associated with the incoming communication.

* * * * *